C. U. CARPENTER.
ELECTRIC PROTECTION SYSTEM.
APPLICATION FILED NOV. 23, 1908.
927,111.
Patented July 6, 1909.
3 SHEETS—SHEET 1.
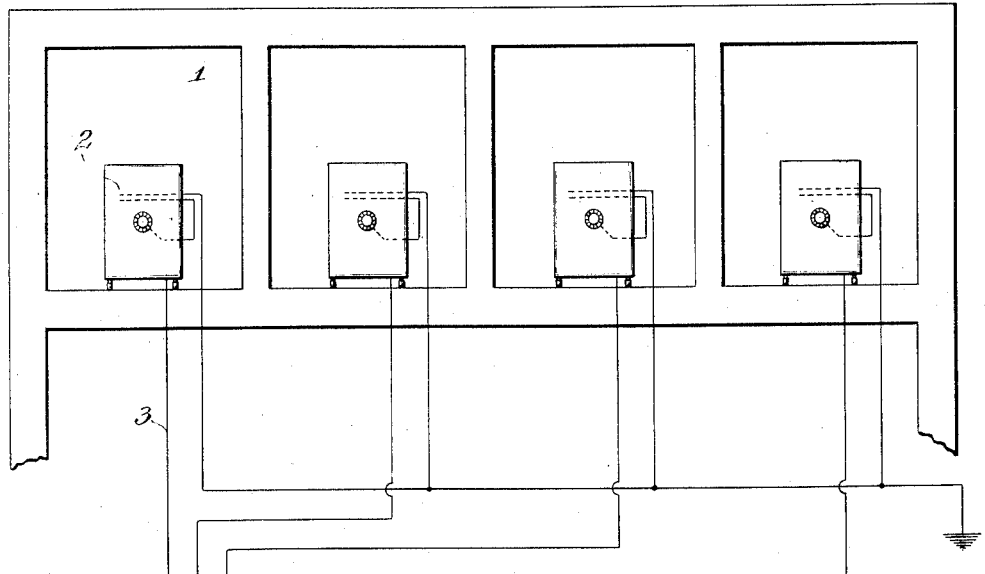
Fig. 1
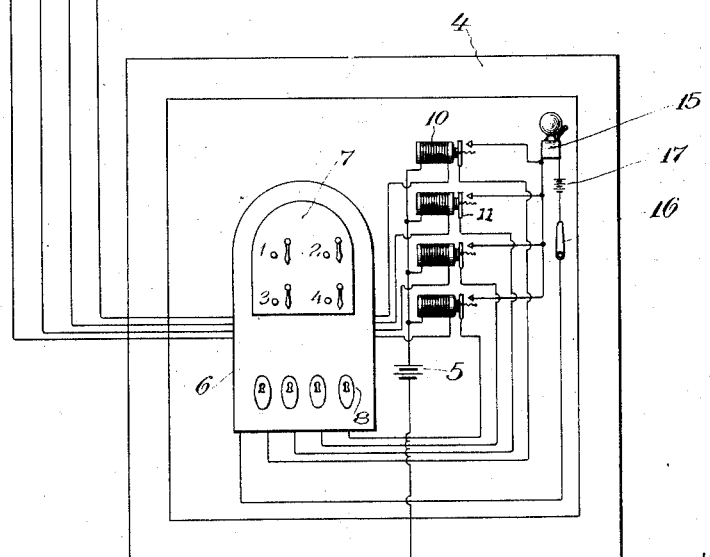
WITNESSES:
A. Newcomt
M. Meikle.
INVENTOR
Charles U. Carpenter,
BY
Prindle and Wright,
ATTORNEYS

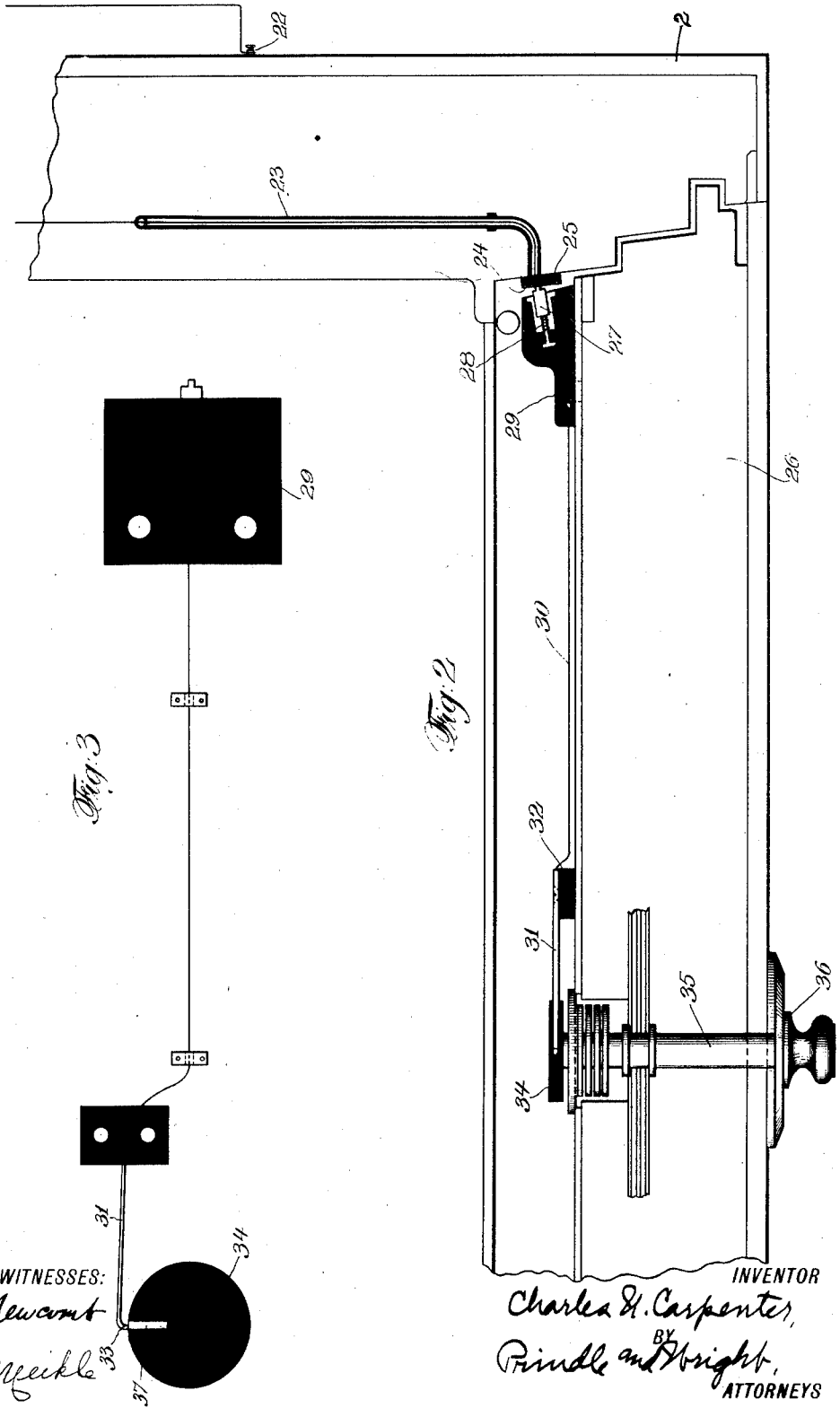

C. U. CARPENTER.
ELECTRIC PROTECTION SYSTEM.
APPLICATION FILED NOV. 23, 1908.
927,111.
Patented July 6, 1909.
3 SHEETS—SHEET 3.
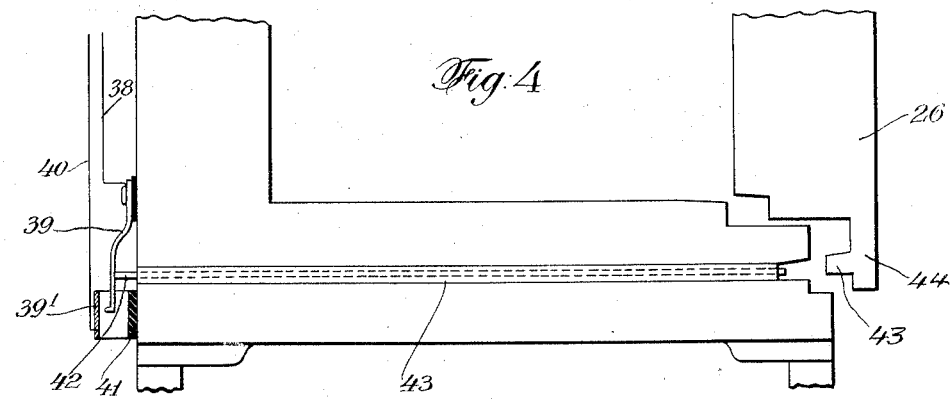
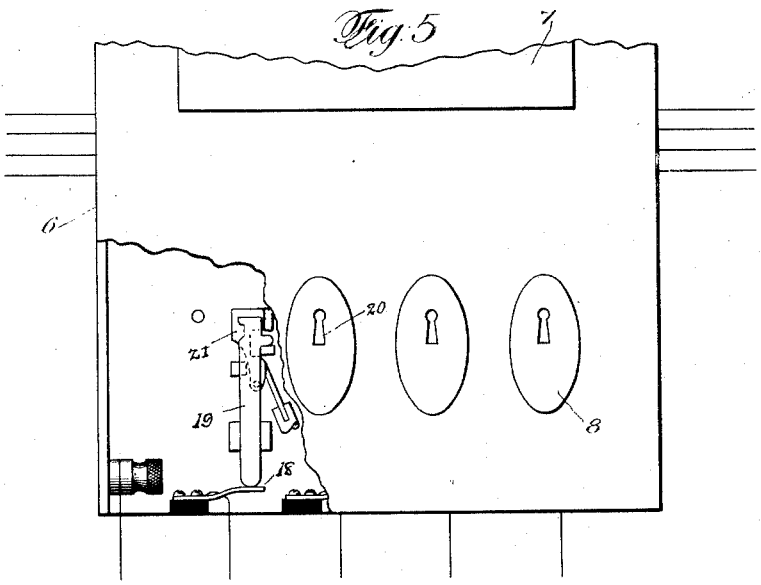
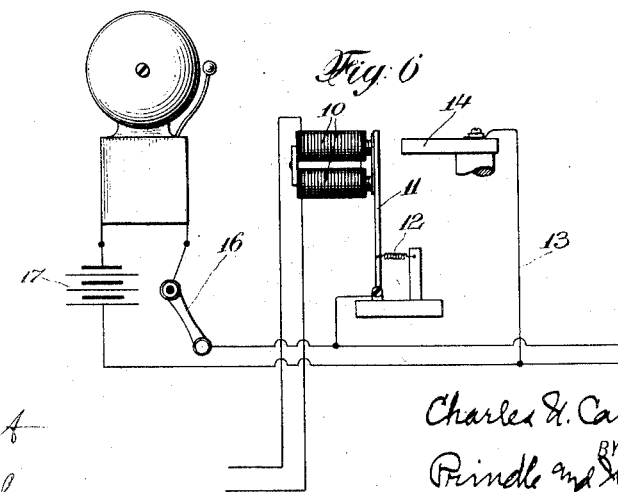
WITNESSES:
A. Newcomb
M. Merkle
INVENTOR
Charles U. Carpenter,
BY
Prindle and Bright,
ATTORNEYS

UNITED STATES PATENT OFFICE.

CHARLES UNDERWOOD CARPENTER, OF NEW YORK, N. Y.

ELECTRIC PROTECTION SYSTEM.

No. 927,111.　　　　　Specification of Letters Patent.　　　Patented July 6, 1909.

Application filed November 23, 1908. Serial No. 463,995.

*To all whom it may concern:*

Be it known that I, CHARLES U. CARPENTER, of New York, in the county of New York and State of New York, have invented a certain new and useful Improvement in Electric Protection Systems, and do hereby declare that the following is a full and exact description thereof.

My invention is especially applicable to systems of electric protection for apartment houses. It can be used, however, to equal advantage in other kinds of buildings, such as office buildings and hotels. It is also applicable even to groups of buildings, that is to say, where some centrally located building is used as an alarm station for the purpose of protecting a number of buildings located at other points in the same community. In applying the invention to a group of buildings, as suggested, the maximum advantage would be gained from protecting buildings which it would be desirable to protect for a considerable period of time, such as the protection of dwellings while the occupants are away for a season or more. When the invention is applied to a building, it is necessary for anyone desiring to throw off the electric system of protection before entering the building, or some part thereof, to go either to the alarm station or central office, which terms are designed to be synonymous, to operate a switch in order to disconnect or shunt out, as the case might be, the portion of the alarm circuit, protecting the structure which it is desired to enter.

My invention is applicable to the protection of an entire building or a portion thereof, but it is preferably designed to be applied to the protection of safes, and especially to a number of safes located at numerous points in a single building. In the latter case, there would, of course, be a central office in the same building with the safes to be protected, which would contain the alarm mechanism as well as the switches designed for the purpose of disconnecting one or more of the protective circuits, controlling the safes.

In general, my system consists of a normally closed main protective circuit for each safe or other portion of the building to be protected, a relay in said circuit, and a normally open alarm circuit adapted to be closed when the main circuit is broken so as to actuate an alarm located at the central office. The alarm circuit is adapted to be controlled in such a way that any one of the structures to be protected can be thrown out of the protective system at any time by a key-operated switch, also located at the central office. All of the main circuits are connected with an annunciator. Preferably the annunciator and all of the key-operated switches are located within one casing in proximity to each other. The key-operated switches may be of such a character that they may all be operated by one and the same key. Still, a much more effective arrangement is to have each key-operated switch adapted to be operated by a different key, so that where the safes are located in different apartments, in an apartment house, for example, the occupant of one apartment would be provided with a key adapted only to operate the protective system for his safe.

I have shown and described my invention in connection with a normally closed main circuit. I wish it, however, to be understood, that it is equally applicable to a normally open main circuit, in which case the usual and well-known changes would be made to adapt it for this purpose.

In the accompanying drawings Figure 1 is a diagrammatic representation of the entire system applied to the protection of a number of rooms or apartments located in the same building; Fig. 2 is a horizontal section of the front portion of a safe included within the protective circuit; Fig. 3 is a fragmental view, in elevation, of the electric circuit as applied to the inner face of the safe door; Fig. 4 is a horizontal section of one side of the safe, showing the method of controlling the circuit at the rear of the safe; Fig. 5 is a fragmental view of the casing, containing the annunciator and the key-operated switches; and Fig. 6 is a detail view of the alarm mechanism.

In the drawings 1 represents each of a series of rooms or apartments in which is located a safe 2 adapted to be connected by a main circuit 3 with a central office or alarm station 4. At the latter place there is located a battery 5, which supplies current to the main circuit 3. One pole of the battery is connected with a series of relays 10 from which current passes to a casing 6, containing an annunciator 7 and key-operated switches 8. The other pole of the battery is grounded at 9. Each magnet 10, normally, in the closed condition of the main circuit, attracts an armature 11 in opposition to the force of a spring 12, adapted to retract the armature.

Each armature 11 is located within a normally open alarm circuit 13, which, when the main circuit is broken and the armature 11 released, is adapted to be closed by the armature coming in contact with a terminal 14. The alarm circuit contains the usual alarm bell 15. It is also provided with a switch 16, so that the entire system can be thrown out of operation.

17 represents a battery for supplying current to the alarm circuit, which is provided with a plurality of branches leading to each of the armatures 11 and the terminals 14.

As shown in Fig. 5, each key-operated switch is constructed in the following manner: One terminal of the alarm circuit is connected to the electrical conducting casing 6. A portion of each branch of the alarm circuit proceeding from the alarm mechanism, after entering the casing 6, is connected with an insulated spring contact 18 supported at the bottom of the casing. A vertically reciprocable bar 19 is adapted to be moved into and out of contact with the contact 18 by the use of a key of the ordinary type, which may be inserted in a key-hole 20. A usual type of lock mechanism is provided at 21, so as to prevent the bar 19 from being reciprocated except when the proper key is inserted in the particular key-hole to operate the switch.

In Fig. 2 is shown a means for connecting the main circuit with the safe door. One terminal of the main circuit contacts with the inclosing and conducting casing of the safe at 22. The other terminal is led into the safe at any convenient point through an insulating tube 23, and is finally attached at the door frame to a contact 24 supported upon an insulating block 25. The door 26 of the safe 2 at the corresponding point is provided with a spring-pressed contact 27, adapted normally to be pressed into contact with the contact 24 by means of a spring 28. The conducting portion of the spring contact 27 is carried by an insulating block 29 supported upon the inner face of the door. From this point the main circuit is led by means of a wire 30 to a spring finger 31 supported upon an insulating block 32. The end of the spring finger is bent for a short distance at right angles to form a contact 33 resting upon a disk 34 fixedly attached to the inner end of a shaft 35, constituting a portion of a combination lock 36. The disk 34 is made of some non-conducting material and is provided at one point with a plug 37 made of conducting material and adapted to conduct the current to the contact 33 from the shaft 35 of the combination lock. The details of the disk 34 and the contact finger 31 are shown in Fig. 3.

Referring now to Fig. 4, the main circuit is provided with a branch 38 which is attached to a spring contact 39 supported upon a portion of the outer casing of the safe.

The spring contact 39 is adapted at times to be forced into contact with conducting plate 39', which is attached to the remaining branch of the circuit by a wire 40. The conducting plate 39' is supported by an insulating block 41. A rod 42 passes through a pipe 43 embedded in the wall of the safe and rests upon the inner face of the spring contact 39. The other end of the rod 42 terminates at the front of the safe in the path of the free end 44 of the safe door 26. The safe door at this point is provided with a projection 45, which, in the closed position of the door, pushes the rod 42 toward the rear, in which position it makes electric contact between the conducting plate 39', and the spring contact 39.

I have shown on the drawings a safe consisting of an exterior metal casing $2^a$ provided with fire-proof filling material 46. It will be readily seen, however, that the wires could be just as easily connected in the proper manner to a safe which is made entirely of conducting material.

The apparatus operates as follows: The current proceeds from the battery 5, and then passes through each of the magnets 10, where the main circuit is divided to produce one branch for each of the magnets. All of these branches then proceed into the casing 6 to the annunciator 7, and connections are made at this point with the annunciator so that each element of the annunciator will indicate the condition of each branch of the main circuit. The several branches of the main circuit then pass through the casing 6 and out of the central office 4 to the various protected structures, which in this instance are shown and described as a series of safes located in various rooms. Each branch of the main circuit is connected to the outer conducting wall of a safe, through which current passes to the combination lock 36 located in the door of the safe, and thence to the conducting plug 37 located in the disk 34 carried upon the combination lock shaft 35. In the operative position of the apparatus, as shown in the drawings, that is, when the main circuit is closed through the conducting plug in the aforesaid disk, the current passes from the conducting plug through the insulated spring finger 31, thence through the wire 30, the door contacts 27, 24, thence through the pipe 23, and finally to a wire that is grounded. As shown in Fig. 4, a subsidiary branch of each of the aforesaid branches of the main circuit is led to the rear of the safe, and in the operative position of this branch, i. e., that shown in Fig. 4, the circuit is closed at this point also.

In the closed position of the main circuit as described, the several armatures 11 will be attracted to the various relay magnets 10 so that the alarm circuit is broken in each of its branches. Should any branch of the main circuit be broken for any reason, such as might be occasioned by an unauthorized attempt to enter the safe, the particular relay corresponding to this branch would be operated so as to release the corresponding armature and close the alarm circuit, causing the alarm to ring. In such a state of affairs, the element of the annunciator corresponding to the particular branch of the main circuit interfered with would, of course, be actuated to show the location of the structure upon which an attack has been made.

Whenever it is desired to disconnect the protective system so that the protected structure may be entered by an authorized person without ringing the alarm, the person in question goes to the central office and by the insertion of his key into the particular key-operated switch which controls his portion of the protective system, disconnects the branch of the alarm circuit corresponding to his portion of the protective system. Under these circumstances, when he then proceeds to open his safe and thereby breaks the portion of the main circuit corresponding thereto, the armature in the relay controlled by this branch of the protective circuit is released, and allowed to be retracted into contact with the conducting terminal 14. This, however, does not cause the alarm to ring, inasmuch as the key-operated switch corresponding to this particular relay and armature has been operated to break this branch of the alarm circuit. Consequently, although the alarm circuit has been closed at the relay corresponding to this branch of the alarm circuit, nevertheless the break produced by the operation of the key-operated switch prevents the alarm circuit from being entirely completed.

It will be seen from the very small size of the conducting plug 37 located in the insulating disk 34, that if any attempt is made to enter the safe by moving the combination lock, the main circuit will immediately become broken so as to ring the alarm. But even if no attempt is made to disturb the position of the combination lock but the door of the safe is opened, the consequent release of the spring contact located at the rear of the safe will cause it to spring away from the conducting plate 39' so as to break the main circuit at this point, resulting in the ringing of the alarm at the central office. Furthermore, it will be obvious that if any attempt is made to disable the system by cutting the wires located in the main circuit, this also will result in the ringing of the alarm.

Usually in the installation of my apparatus, I locate the alarm mechanism, together with the annunciator and the key-operated switches, in a central office where there is preferably always someone present. This would, of course, be necessary merely because of the use of an annunciator, inasmuch as whenever any one of the circuits is tampered with so as to ring the alarm, the call should be immediately answered and the cause of the break in the main circuit inquired into. Under these circumstances, the key-operated switches have far greater utility than could possibly be the case were the key-operated switches located at various points in a building, or even in some room where ordinarily there is no one present. This follows from the fact that it would be very difficult indeed for anyone to enter the central office, where the instruments are being continually watched, and operate a switch to throw off a protective circuit without being the true owner of the proper key designed to operate the switch of this circuit. Even if the proper key had been loaned to someone by the true owner thereof, it would be only natural when such a person should attempt to operate the key-operated switch corresponding to that key, for the clerk or other person located in the central office to inquire into the reasons why he was in possession of the proper key, and why he desired to throw off the electric protection from any particular protected structure, such as a safe.

It will be clear from the numerous applications of my invention that are possible, some of which have been herein described, that many changes might be made in the details of the invention and in the details of its application to the protection of various different structures, without departing from the fundamental principles thereof.

I claim:

1. In a device of the character described, the combination of a plurality of protected structures distantly removed from one another, a main electric protective circuit therefor, an alarm mechanism and a series of key-operated switches in proximity to one another, each of which is adapted when opened to remove the alarm mechanism from the control of a corresponding protected structure.

2. In a device of the character described, the combination of a plurality of protected structures distantly removed from one another, a main electric protective circuit having a plurality of branches, each of which includes one of said structures, an alarm mechanism and a series of key-operated switches, each of which is adapted when opened to remove the alarm mechanism from the control of a corresponding protected structure.

3. In a device of the character described, the combination of a plurality of protected structures, a main electric protective circuit therefor, an alarm circuit containing an alarm controlled by the main circuit, and a series of key-operated switches located in the alarm circuit, each of which is adapted when opened to remove the alarm from the control of a corresponding protected structure.

4. In a device of the character described, the combination of a plurality of protected structures distantly removed from one another, a main electric protective circuit therefor, an alarm circuit containing an alarm controlled by the main circuit, and a series of key-operated switches located in the alarm circuit, each of which is adapted when opened to remove the alarm from the control of a corresponding protected structure.

5. In a device of the character described, the combination of a plurality of protected structures distantly removed from one another, a main protective circuit therefor, an alarm circuit, containing an alarm controlled by the main circuit, and a series of key-operated switches located in the alarm circuit at a central office, each of which is adapted when opened to remove the alarm from the control of a corresponding protected structure.

6. In a device of the character described, the combination of a plurality of protected structures distantly removed from one another, a main electric protective circuit having a plurality of branches, all of which are operatively connected with an annunciator, each of said branches including one of said structures, an alarm mechanism and a series of key-operated switches, each of which is adapted when opened to remove the alarm from the control of a corresponding protected structure.

In testimony that I claim the foregoing I have hereunto set my hand.

CHARLES UNDERWOOD CARPENTER.

Witnesses:
H. H. SMITH,
ADÉLE H. WRIGHT.